United States Patent
Illsley et al.

(10) Patent No.: US 11,236,244 B2
(45) Date of Patent: Feb. 1, 2022

(54) ENERGY CURABLE COMPOSITIONS COMPRISING PARTIALLY ACRYLATED POLYOLS

(71) Applicant: SUN CHEMICAL CORPORATION, Parsippany, NJ (US)

(72) Inventors: Derek Ronald Illsley, Bath (GB); Jürgen Dieker, Karlstein am Main (DE); Lars Keller, Karlstein am Main (DE)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 17/270,350

(22) PCT Filed: Jul. 1, 2019

(86) PCT No.: PCT/GB2019/051861
§ 371 (c)(1),
(2) Date: Feb. 22, 2021

(87) PCT Pub. No.: WO2020/053544
PCT Pub. Date: Mar. 19, 2020

(65) Prior Publication Data
US 2021/0253882 A1    Aug. 19, 2021

Related U.S. Application Data

(60) Provisional application No. 62/729,097, filed on Sep. 10, 2018, provisional application No. 62/760,142, filed on Nov. 13, 2018, provisional application No. 62/818,772, filed on Mar. 15, 2019, provisional application No. 62/821,574, filed on Mar. 21, 2019.

(51) Int. Cl.
| | |
|---|---|
| *C09D 11/101* | (2014.01) |
| *B41M 5/00* | (2006.01) |
| *B41M 7/00* | (2006.01) |
| *C08G 65/00* | (2006.01) |
| *B41J 11/00* | (2006.01) |
| *B41M 5/52* | (2006.01) |
| *C09D 11/107* | (2014.01) |
| *B41J 2/21* | (2006.01) |

(52) U.S. Cl.
CPC .......... *C09D 11/101* (2013.01); *B41J 2/2107* (2013.01); *B41J 11/00214* (2021.01); *B41M 5/0023* (2013.01); *B41M 5/52* (2013.01); *B41M 7/0081* (2013.01); *C08G 65/002* (2013.01); *C09D 11/107* (2013.01)

(58) Field of Classification Search
CPC ... C09D 11/107; C09D 11/322; C09D 11/101; C09D 11/326; C09D 11/38; C09D 11/36; C09D 11/40; C09D 11/30; C09D 11/32; C09D 11/324; C09D 11/328; C09D 11/102; C09D 11/005; C09D 11/54; C09D 11/52; C09D 11/106; C09D 11/03; C09D 11/037; C09D 11/033; B41J 11/0021; B41J 2/2107; B41J 11/002; B41J 2/01; B41J 2/211; B41J 2/1433; B41J 2/17; B41J 2/17593; B41J 2/1755; B41J 2/2114; B41J 2/2117; B41J 2/2056; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/045; B41J 11/0015; B41J 2/04581; B41J 2/055; B41J 2/14201; B41J 2002/16502; B41J 25/001; B41J 25/34; B41J 25/003; B41J 2/21; B41J 25/312; B41J 2025/008; B41J 2202/21; B41J 2/17596; B41J 2/16508; B41J 2/1652; B41J 2/16538; B41J 2/175; B41J 2/17563; B41M 5/0023; B41M 7/0081; B41M 3/006; B41M 3/003; B41M 5/0011; B41M 5/0017; B41M 5/0047; B41M 7/00; B41M 7/0072; B41M 5/52; B41M 5/5218; B41M 5/5227; G02B 5/20; G02B 5/223; C08K 2003/2237; C08K 3/11
See application file for complete search history.

(56) References Cited

U.S. PATENT DOCUMENTS

| | | |
|---|---|---|
| 5,543,557 A | 8/1996 | Bergvall |
| H1712 H | 2/1998 | Papalos et al. |
| 6,090,866 A | 7/2000 | Kranig et al. |
| 9,290,611 B2 | 8/2016 | Klok et al. |
| 9,550,898 B2 | 1/2017 | Loccufier et al. |
| 9,682,916 B2 | 6/2017 | Ciceron |

(Continued)

FOREIGN PATENT DOCUMENTS

| | | |
|---|---|---|
| CN | 104 031 475 B | 2/2016 |
| EP | 1 911 814 A1 | 4/2008 |

(Continued)

OTHER PUBLICATIONS

International Search Report issued in International Application No. PCT/GB2019/05186, dated Sep. 12, 2019.

(Continued)

*Primary Examiner* — Manish S Shah
(74) *Attorney, Agent, or Firm* — Marian E. Fundytus; Ostrolenk Faber LLP.

(57) ABSTRACT

Energy curable composition including partially acrylated polyols, and one or more monofunctional or multifunctional free-radically polymerizable ethylenically unsaturated monomer and/or oligomers.

22 Claims, No Drawings

(56) References Cited

U.S. PATENT DOCUMENTS

| | | | |
|---|---|---|---|
| 9,701,856 B2 | 7/2017 | Loccufier et al. | |
| 9,714,355 B2 | 7/2017 | Illsley et al. | |
| 9,796,865 B2 | 10/2017 | Claes et al. | |
| 2007/0142492 A1* | 6/2007 | Odell | C09D 11/101 522/74 |
| 2008/0182078 A1* | 7/2008 | Johnson | B29C 64/106 428/195.1 |
| 2012/0065326 A1* | 3/2012 | Overbeek | C09D 11/101 524/591 |
| 2014/0333704 A1* | 11/2014 | Takabayashi | B41J 11/002 347/102 |
| 2015/0038662 A1 | 2/2015 | Takamura et al. | |
| 2015/0248055 A1* | 9/2015 | Fall | C08G 18/792 430/5 |
| 2016/0145453 A1* | 5/2016 | Kaczun | C09D 11/101 427/256 |
| 2016/0200938 A1* | 7/2016 | Berger | C09D 11/101 428/423.4 |
| 2017/0088724 A1* | 3/2017 | Cappelle | C09D 125/08 |
| 2017/0101547 A1* | 4/2017 | Loccufier | B41J 2/01 |

FOREIGN PATENT DOCUMENTS

| | | |
|---|---|---|
| EP | 2 091 883 A1 | 8/2009 |
| JP | 2000 072832 A | 3/2000 |
| KR | 2015 0142512 A | 12/2015 |
| WO | WO 2005/045523 A1 | 5/2005 |
| WO | WO2015/148094 | 10/2015 |
| WO | WO 2016/186838 A1 | 11/2016 |
| WO | WO2017/151137 | 9/2017 |
| WO | WO2017/180491 | 10/2017 |
| WO | WO 2017/180496 | 10/2017 |

OTHER PUBLICATIONS

Written Opinion of the International Searching Authority issued in International Application No. PCT/GB2019/05186, dated Sep. 12, 2019.

International Preliminary Report on Patentability (Chapter II of the Patent Cooperation Treaty) issued in International Application No. PCT/GB2019/05186, dated Aug. 6, 2020.

* cited by examiner

ENERGY CURABLE COMPOSITIONS COMPRISING PARTIALLY ACRYLATED POLYOLS

CROSS REFERENCE TO RELATED APPLICATIONS

The present application is a 35 U.S.C. § 371 National Phase application based on PCT/GB2019/051861, filed 1 Jul. 2019, which claims the benefit of U.S. Provisional Application Nos. 62/729,097, filed 10 Sep. 2018, 62/760,142, filed 13 Nov. 2018, 62/818,772, filed 15 Mar. 2019, and 62/821,574, filed 21 Mar. 2019, the subject matter of each of which is incorporated by reference in their entirety.

The present invention relates to partially acrylated polyols (polyols in which less than 100% of the alcohol groups have been acrylated) to promote the energy-curing (particularly UV and electron beam curing) of free radically polymerizable compositions, and in particular compositions comprising ethylenically unsaturated monomers and oligomers.

No references describing the benefits from using partially acrylated polyols in UV or EB-curable free-radically curable compositions have been identified. As such, it is believed that the current invention is the first recognized use of such substances to enhance the radiation cure of inks and coatings.

The invention covers the most surprising finding that the incorporation of polyols and in particular polyols where less than 100% of the alcohol groups have been acrylated can promote the energy-curing (UV and electron beam curing) of compositions comprising ethylenically unsaturated monomers and oligomers. Although polyols (acrylate-free) have been found to promote the UV and EB cure of free radically polymerizable compositions they are prone to producing prints where unreacted polyol migrates to the print surface producing smeary surfaces. This tendency for uncured polyol to migrate to print or coating surfaces is a limiting factor. However, by partially acrylating the hydroxy groups of suitable polyols the combined benefits of the cure-enhancing capacity of the alcohol, along with the reactivity of the acrylate groups which bind the partially acrylated polyol into the cured ink or coating to prevent migration to a print surface are achieved. Based on extensive research into this, the inventors have shown that partially acrylated derivatives of ethoxylated polyols, such as ethoxylated derivatives of dipentaerythritol, where less than 90% of the alcohol groups are converted to acrylate via esterification or transesterification with acrylic acid or acrylic acid esters, show surprising enhancement in cure compared with conventional monomers and fully acrylated derivatives of the polyol. Although not specifically directed towards inkjet compositions the inventors have shown that the inclusion of such compounds into compositions suitable for inkjet printing which further comprise blends of acrylate monomers has been shown to provide a considerable reduction in the amount of uncured monomer present in both UV and EB-cured ink film. This is an important finding for applications where high conversion of monomers and oligomers (especially of inkjet compositions) during UV or EB cure is beneficial; such as the printing of food packaging, pharmaceutical packaging, personal care packaging, etc. As well as inkjet, this finding will have potential in other printing/coating applications where low migration of monomers and oligomers from energy-cured inks and coatings is required, such as flexographic, gravure and offset printing. Thus, one of the objectives of the present invention is to reduce the amount of contamination from cured inks/coatings in packaging applications. The present invention' addresses this problem via the reduction or elimination of migratory compounds which are present in conventional inks/coatings and which cause contamination (i.e. compounds with a low migration limit).

The closest identified reference is WO2017/151137, which describes EB-curable inkjet compositions comprising monofunctional monomers bearing a hydroxy group, such as hydroxybutyl acrylate. The capacity of partially acrylated polyol compounds of the current invention to promote EB-cure is not revealed. The inventors have shown, by way of comparative examples, that compositions comprising hydroxybutyl acrylate and made according to the guidelines laid out in WO2017/151137 do not cure as effectively as compositions comprising the partially acrylated polyols of the current invention.

WO2017/180496 and WO2017/180491 describe EB-curable compositions which can optionally comprise ethylenically unsaturated monomers/oligomers comprising poly(alkylene oxide) sub-units. Similarly, WO2015/148094, describes the use of ethylenically unsaturated monomers/oligomers comprising poly(alkylene oxide) sub-units, which promotes the cure of UV-curable compositions. However, none of these records describe the use of partially acrylated polyol containing (poly(alkylene oxide)) substances in energy-curable compositions. As mentioned previously, the inventors have found that partially acrylated polyols are more effective in promoting monomer conversion during both UV and EB-cure compared with fully acrylated derivatives.

In particular, no references describing the use of polyhydroxy-functional compounds, including partially acrylated derivatives, to promote the energy-curing, specifically the UV and EB curing, of inkjet compositions has been identified in the references.

The generally accepted method of producing acrylated polyols, including those polyols bearing poly(alkylene oxide), such as poly(ethylene oxide), sub-units, is to derivatize the alcohol groups to as close as 100% conversion as is possible, leaving minimal alcohol content. This is believed to produce the most reactive monomer for energy-curing, since reactivity is commonly believed to be related to the acrylate functionality of the monomers used in energy-curable inks and coatings. The inventors' findings, with respect to the use of partially acrylated polyols, run counter to this widely held state-of-the-art understanding and is a most surprising and unanticipated finding. As previously mentioned, the benefits from using partially acrylated polyols in energy-curable inks and coatings to reduce the amount of uncured monomer is very significant, making the use of such compounds highly desirable in applications requiring low migration, such as food packaging.

A number of references have disclosed the possibility of preparing acrylated polyols with residual alcohol content, but there has been no connection made between the presence of acrylated polyhydric materials in energy-curable inks and coatings and their capacity to enhance the UV- and EB-cure of such compositions. Thus, USH1712, U.S. Pat. Nos. 5,543,557, 6,090,866 and US2015/0038662 all provide details of how to prepare acrylated polyols, including polyether polyols. USH1712 and U.S. Pat. No. 5,543,557 indicate that the acrylation of polyols might not be 100%, leaving unreacted hydroxy groups on the product monomer. However, there is no indication to any benefit which might accrue from a polyhydric partially acrylated polyol. US2015/0038662 describes acrylate adducts of alkoxylated dipentaerythritol where the total degree of alkoxylation was 5 or less (indicating an average degree of alkoxylation per alcohol group of less than 1). US2015/0038662 did not reveal how blending partially acrylated polyols of the current invention with other monomers and oligomers could produce compositions with enhanced cure response, especially with respect to reducing the amount of uncured monomer or oligomer.

Furthermore, the coating examples revealed in US2015/0038662 comprised dissolving the acrylated dipentaerythritol adducts in an equivalent weight of ethyl acetate solvent, which is not a viable approach for the majority of printing and coating applications.

U.S. Pat. No. 9,682,916 describes how partially acrylated polyols may be used as an intermediate during acrylate monomer synthesis to produce highly functional monomers with improved flexibility compared with conventional highly functional monomers. The disclosed process describes the Michael reaction of the alcohol groups on partially acrylated polyols with the acrylate groups of the same product to produce a chain extended monomer. Clearly, the use of the partially acrylated polyol in this case is to produce a further product without taking advantage of any innate cure-enhancing performance of the partially acrylated polyol precursor.

U.S. Pat. No. 9,290,611 describes how acrylated polyols can be produced by the reaction of diacrylate monomers with dialdehydes to produce a condensation type polymer. Again, no disclosure of the benefit in terms of cure enhancement is mentioned.

A number of patents describe UV-curable low migration inkjet compositions. U.S. Pat. No. 9,714,355 describes compositions comprising blends of low migration photoinitiators, including type I (cleavage) photoinitiators. U.S. Pat. No. 9,550,898 similarly describes UV-curable low migration inkjet compositions which also contain acylphosphine oxide photoinitiators as the type I photoinitiator. U.S. Pat. No. 9,796,865 describes UV-curable low migration inkjet compositions comprising hybrid monomers such as 2-(2-Vinyloxyethoxy)ethyl acrylate ('VEEA'). U.S. Pat. No. 9,701,856 describes how inkjet compositions comprising essentially VEEA as the only monomer can be combined with thiols to deliver low migration printable solutions.

From the identified references, it seems that the advantages that can be gained in enhancing the cure of energy-curable inks and coatings through the use of partially acrylated polyols has not been described nor alluded to. The inventors have shown that simple polyols and alkoxylated polyols can themselves promote cure, in terms of reducing the amount of uncured monomer, but such polyols are prone to migration to the cured ink/coating surface producing undesirable effects, particularly when used at any significant concentrations, such as greater than 5.0% (w/w) of the total ink or coating formulation. However, by partially acrylating a polyol, such as ethoxylated dipentaerythritol, which will be demonstrated by way of the examples, the benefits of using a polyol are maintained but without the attendant issue of uncured material migrating to the cured ink/coating surface. By partially acrylating a polyol, one enables significantly higher concentrations to be used than would be possible with the parent (non-acrylated) polyol, thus gaining even greater advantage than might be possible with a simple polyol.

Furthermore, the capacity of partially acrylated polyols to reduce the amount of uncured monomers and/or oligomers in energy-cured ink and coatings is much greater than fully acrylated polyol monomers. It is the accepted wisdom that higher functional monomers should provide enhanced cure; the current invention surprisingly shows otherwise. The advantages obtainable from the invention in both UV- and EB-curing of inks and coatings where low migration (of uncured monomers and oligomers) is required are obvious. The capacity of partially acrylated polyols to reduce the amount of uncured monomer is significant.

Compared with the most relevant reference in this area, WO2017/151137, the inventors have shown by way of their comparative examples that the inclusion of the monohydric monoacrylate monomer, hydroxybutyl acrylate, into UV- and EB-curable inkjet compositions had no observable significant impact on any lowering of the amount of uncured monomer detected in a cured ink film compared with compositions comprising substances according to the current invention.

The use of energy cure-promoting, partially acrylated, polyol compounds according to the current invention is especially useful for low migration printing and coating applications, and more especially of food packaging where the lowest possible levels of uncured monomers in printed or coated articles would be desirable.

Although primarily directed towards energy-curable inkjet compositions it should be understood that the partially acrylated polyols of the invention may be used in any other energy-curable composition where their benefit would be desirable, such as, but not limited to, energy-curable flexo inks, energy-curable offset inks, energy-curable overprint varnishes.

As is apparent from the foregoing, the identified references have not disclosed, or alluded to the use of partially acrylated polyol substances of the current invention to promote the cure of compositions comprising ethylenically unsaturated monomers and oligomers under the action of UV and EB radiation.

This will be advantageous in printing and coating applications where the maximum conversion of monomers and oligomers is desirable, such as the printing and coating of food packaging.

DETAILED DESCRIPTION OF THE INVENTION

According to the present invention, there is provided an energy-curable composition comprising a partially acrylated polyol. The energy-curable composition is suitably a free radically polymerizable compositions, and in particular the energy-curable composition further comprises a blend of ethylenically unsaturated monomers and oligomers.

The partially acrylated polyol of the invention is preferably described in terms of the following general expression:

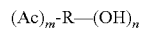

where;
Ac=an acrylate (or methacrylate) group
m+n≥2
n≥1
m≥1
R=any organic polyol residue, including, but not limited to, aliphatic and aromatic species, poly(ethoxylated) and poly(propoxylated) polyol cores. The molecular weight of the polyol core should preferably be less than 1,500 g/mol.

Particularly preferred polyol cores are ethoxylated adducts of trimethylolpropane, pentaerythritol, ditrimethylolpropane and dipentaerythritol. In a further instance an organic residue refers to any possible sub-unit that may be bound to the acrylated polyol of the invention and includes, but is not limited to: alkanes, aromatic hydrocarbons, heterocyclics, polyesters, polyamides, polyacrylics, styrene-acrylic copolymers, polyurethanes, polyethers. In the case of polyethers, the invention encompasses polyols which have been reacted with ethylene oxide, propylene oxide and higher alkylene oxides. Polyethers encompassed by the invention also include poly(ethylene glycol)s, poly(propylene glycol)s and higher poly(alkylene oxide)s.

There is no restriction on the amount of any blend of partially acrylated polyol compounds according to the invention that can be incorporated into a free radically polymerizable energy-curable composition other than that sufficient is added to satisfy the preferred minimum hydroxy value criterion of the composition, namely that the contribution to the hydroxy value of the compositions provided by primary and secondary alcohols of the partially acrylated polyols of the invention is preferably ≥2.5 mgKOH/g.

It is preferred that the hydroxy groups of the partially acrylated polyols of the invention should be either primary or secondary alcohols. More preferred polyols are ethoxylated or propoxylated adducts of trimethylolpropane, ditrimethylolpropane, glycerol pentaerythritol, dipentaerythritol and sorbitol. Especially preferred polyols are ethoxylated or propoxylated adducts of trimethylolpropane, ditrimethylolpropane, glycerol pentaerythritol, dipentaerythritol and sorbitol where the average degree of alkoxylation per alcohol group is at least 1. In the case of dipentaerythritol the inventors have used a dipentaerythritol with a total degree of ethoxylation of 13 (or an average degree of alkoxylation per alcohol of 2.2).

A further aspect of the invention is that the hydroxy value of the composition comprising any polyol compound should preferably be ≥2.5, and more preferably ≥5.0 mgKOH/g.

Thus, the inventors have found that partially acrylated polyols, such as triethylene glycol, polyethylene glycol, trimethylolpropane, ethoxylated trimethylolpropane, glycerol, propoxylated glycerol, ethoxylated pentaerythritol, ethoxylated dipentaerythritol, etc. significantly enhance the cure (UV and EB) of compositions comprising ethylenically unsaturated monomers and oligomers. This is a most surprising finding and one not anticipated by the references or perceived wisdom in the field. The inventors do not wish to be bound to any particular theory but consider that alcohols, particularly primary and secondary alcohols, encompassed by the invention promote cure under irradiation by UV or electron beam by generating free radicals that can initiate the polymerisation of ethylenically-unsaturated monomers and oligomers. The most likely mechanism for this postulate is the generation of free radicals at the α-carbon to the alcohol by the scission of a proton to produce the required free radical which initiates the free radical polymerisation of ethylenically unsaturated substances (especially acrylates).

The inventors have found that issue with the use of non-acrylated polyol compounds such as those noted above in energy-curable compositions is the tendency of any uncured component to migrate to a cured ink or coating surface causing consequent issues such as surface mar ('smeary' surfaces) and polyol set-off in printed reels and stacks. Thus, typically, the concentration of a non-acrylated polyol in an energy-curable coating ink or coating composition is preferably restricted to less than 7.5% and more typically to less than 5.0%. This restriction places a limit on the positive effect that can be obtained from the use of these polyols. It is this issue in particular that the current invention aims to address; by introducing (meth)acrylate (or other ethylenically unsaturated groups) into the polyol whilst maintaining a significant hydroxy content.

There is no restriction on the amount of the partially acrylated polyol that may be used in any energy-curable ink or coating composition and may be between 1 and 100% of the polymerizable component of the energy-curable ink or coating composition, more preferably between 5 and 100% of the polymerizable component and most preferably between 10 and 100% of the polymerizable component of the energy-curable composition.

Typically, the partially acrylated polyol is present in an amount of no more than 30.0% (w/w), typically no more than 25.0% (w/w), typically no more than 20.0% (w/w) of the composition.

To gain further benefit from the partially acrylated polyols the invention also covers compositions comprising the partially acrylated polyols of the invention and non-acrylated polyols. In this case, it is preferred that the content of the non-acrylated polyol be less than 7.5% (w/w) of the composition, or less than 5.0% (w/w) of the composition.

Energy-curable compositions comprising the partially acrylated polyols of the invention are especially suited to printing and coating applications where high conversion of monomer and oligomer is required, especially low migration printing and coating of food packaging, pharmaceutical packaging, etc. By enhancing the UV-cure of energy-curable compositions comprising photoinitiators it is possible to minimise the amount of photoinitiator used to deliver an equivalent degree of cure compared with compositions which do not contain partially acrylated polyols (and polyols) of the current invention.

This is advantageous on a number of counts, namely minimisation of the migration risk associated with photoinitiators and reduced odour. Thus, it is preferable that compositions comprising the partially acrylated polyols of the invention, which are solely cured via the action of UV-light, should comprise less than 8.0% of any blend of photoinitiators.

Although EB-curable compositions comprising partially acrylated polyols of the invention do not require photoinitiators it should be understood that their use, especially in inkjet compositions, may be useful as a means to affect pinning of the ink prior to final EB-cure, as is described in WO2017180491 and WO2017180496.

Further advantages from the use of partially acrylated polyols in energy-curable compositions and which the inventors have observed during their studies are improvements in adhesion to plastic films and reduced shrinkage. Not wishing to be bound by any theory these improvements may arise from the use of ethoxylated polyols which are able to mitigate shrinkage via a reduction in acrylate density as well as the presence of the alcohol groups which provide polar groups which may enhance adhesion and produce chain transfer which would also limit the degree of cross-linking and hence shrinkage in an energy cured ink or coating of the invention.

Definitions

Energy Curing—Refers to either UV or EB-curing, although covers the use of any other actinic radiation.

UV curing—in the context of the current invention, is a process that uses UV light to initiate the free radical polymerization of ethylenically unsaturated monomers and oligomers. This can be achieved with any selection of UVA, UVB and UVC light and may be achieved via the optional incorporation of photoinitiators. It should be understood that the invention although directed towards the curing under UV light also encompasses visible light. Non-limiting UV sources such as the following can be used; low pressure mercury bulbs, medium pressure mercury bulbs, a xenon bulb, excimer lamps, a carbon arc lamp, a metal halide bulb, a UV-LED lamp or sunlight. It should be appreciated by those skilled in the art that any UV light source may be used to cure compositions prepared according to the current invention.

EB Curing—compositions prepared according to the present invention are suitable for curing under the action of electron beam (EB) radiation. EB curing describes the use of electron beam radiation to polymerize a combination of monomers and oligomers onto a substrate. In the case of the invention the monomers and oligomers used are those which polymerise free radically, and hence contain ethylenically unsaturated groups, such as acrylate.

Monomer—in the context of the invention is any species, including what are referred to as oligomers, bearing any number of ethylenically unsaturated groups. Although the invention is primarily directed towards those monomers bearing acrylate groups it should be understood that any other ethylenically unsaturated group is covered by the invention, including but not limited to; methacrylate, vinyl ether, propenyl ether, maleate, alkene, acrylamide.

Low Migration—the compositions of the current invention lend themselves to applications including the printing of food packaging, pharmaceutical packaging, personal care and household packaging, display boards in supermarkets, etc. In all these applications it is advantageous that the EB-cured ink, or coating, contains minimal amounts of uncured material that could leach ('migrate) out of the ink into the surrounding environment thereby causing unwanted contamination. This is of particular concern for food packaging where any contamination of the packaged food from undesirable, migratable, ink components should be minimized.

Hydroxy Value—this is a term well understood by those skilled in the art. It is a measure of the content of hydroxyl groups in a substance expressed in terms of the mass of potassium hydroxide (KOH) in milligrams equivalent to the hydroxyl content in one gram of the substance. As will be described later, compositions prepared according to the current invention preferably comprise acrylated polyol substances comprising primary or secondary alcohols and the preferred hydroxy value of any ink or other composition prepared according to the invention should be greater than 2.5 mgKOH/g.

Molecular Weight. Unless otherwise stated, a reference to "molecular weight" or "average molecular weight" is preferably to the number average molecular weight ($M_n$). The molecular weight can be measured by those techniques known in the art such as gel permeation chromatography. For instance, molecular weight determination may be conducted on a Hewlett-Packard 1050 Series HPLC system equipped with two GPC Ultrastyragel columns, 103 and 104 Å (5 µm mixed, 300 mm×19 mm, Waters Millipore Corporation, Milford, Mass., USA) and THF as mobile phase. Preferably, molecular weight is calculated by comparison with a polystyrene standard. The skilled person will appreciate that this definition of molecular weight applies to polymeric materials which typically have a molecular weight distribution. The molecular weight of non-polymeric compounds, such as the simple molecules of glycerol and trimethylolpropane, are defined and calculated on the basis of the molecular structure of the compound.

The invention describes the most surprising finding that partially acrylated polyol compounds, such as the partially acrylated ethoxylated dipentaerythritol as discussed in the inventive examples, can promote the cure of compositions comprising monomers and oligomers bearing ethylenically unsaturated groups, such as acrylates, under the action of UV (and EB) radiation. This surprising finding realizes its effect by delivering lower amounts of uncured monomer after curing compared with compositions that do not contain such compounds. This finding, which to the best of the inventors' knowledge, has not been previously described or alluded to. The finding has particular relevance for applications such as the printing of food packaging, which require that any ink or coating after application has low levels of substances that might migrate from the ink and/or coating and thence contaminate the surrounding environment, in case of food packaging the foodstuff itself. With the increasing awareness of the potential for contamination risks associated with food packaging, then any printing/coating process that can deliver an acceptably low migration risk has considerable worth. The current invention, via the use of compositions comprising partially acrylated polyols, provides a solution in this respect.

Although the inventors have shown that non-acrylated polyols most surprisingly, and significantly, promote the cure of UV- and EB-curable, compositions comprising ethylenically unsaturated monomers, there is a tendency for them to migrate to the cured ink or coating surface resulting in what is perhaps best described as a 'smeary' surface. This effect is also referred to as the well-known term, "bloom". Clearly, in most instances of printing this is undesirable and it restricts the amount of non-acrylated polyol that may be incorporated into an ink or coating. It is an objective of this invention to reduce or eliminate "bloom". The inventors have found that when the concentration of polyols (and certainly those with molecular weights of less than 1,000 g/mol) exceeds 7.5% (w/w) or typically 5.0% (w/w) of the composition, then surface "bloom" of the polyol may occur. By partially acrylating the polyol it has proven possible to eliminate the negative impact of surface bloom whilst maintaining a significant proportion of the cure promoting effect associated with the polyol. The analysis of the references, although finding mention of the possibility of the preparation of partially acrylated polyols, has not revealed any instance, or suggestion, of the positive effect that their incorporation into free-radically polymerizable energy-curable compositions comprising ethylenically unsaturated monomers (and oligomers) has on the cure performance, particularly in terms of reducing the amount of uncured monomer after curing, whether that be UV-, or EB-curing. This finding is especially relevant for printing and coating applications where the highest conversion of monomers is desirable (or, put another way, the lowest amount of uncured monomer which might migrate from the cured ink or coating), especially low migration inks and coatings for food packaging, pharmaceutical packaging, personal care packaging, toys, and the like. As well as finding that the incorporation of partially acrylated polyols into energy-curable compositions can reduce the amount of uncured monomer after curing the inventors have also found that they can promote the cure in other respects, most noticeably the surface cure of UV-curable inks and coatings cured in air. Surface cure can be an issue facing low viscosity fluids such as inkjet and flexographic compositions due to the impact of oxygen inhibiting cure at the print surface. The inventors have found that partially acrylated polyols of the invention can significantly promote the surface cure of UV-curable inkjet compositions cured in air, with conventional medium pressure mercury lamps and UV-LED. Since there is a drive towards the use of UV-LED cure then this capacity of partially acrylated polyols of the invention to improve the surface cure is again a most useful property.

The inventors do not wish to be bound by any theory as to why the partially acrylated polyols used in energy-curable ink and coating compositions should promote cure so significantly, but conjecture that the pendant alcohols of these compounds are, in one respect, able to act as co-initiators of free radical polymerization. They may achieve this via a transfer process at the carbon adjacent to the hydroxy group. For primary and secondary alcohols, it is likely that this is a H-transfer process. Thus, polyols may act synergistically with photoinitiators to produce free radicals that may initiate the polymerization of ethylenically unsaturated monomers and oligomers. It can be readily envisaged that substances comprising more than one primary and/or secondary alcohol as part of their structure would have the capacity to form a plurality of free radicals via this postulated free radical transfer process. This would lead to the potential formation of a more highly crosslinked network during the energy-curing process, which conventional wisdom indicates would lead to a lowering of the amount of uncured monomers and oligomers in any cured coating/ink composition. For electron beam curing, again, the alcohols of the partially acrylated polyol may take part in the initiation process through possible cleavage reactions at the alcohol, or adjacent α-carbon, under electron impact, to produce initiating radicals. The potential for partially acrylated polyols to participate in chain transfer processes may also account for their ability to help improve the surface cure of UV-curable compositions in air. This may result from H-transfer from the partially acrylated polyol to stable peroxy radicals (produced by reaction of oxygen with a propagating radical) to produce reactive radicals which can re-initiate polymerization.

A further aspect of the invention is that the hydroxy value of the inventive compositions contributed by primary and secondary alcohols should be ≥2.5, and preferably ≥5.0 mgKOH/g equivalent. The inventors have calculated the theoretical hydroxy values of a number of the inventive examples to substantiate this.

In yet a further aspect of the invention, compositions of the current invention may optionally comprise any blend of photoinitiators. Such compositions may then be cured by UV or a combined UV and EB curing process, as revealed by WO2017/180491 and WO2017/180496. Where the inks or coatings of the invention are intended for the application to food packaging then those photoinitiators having low migration potential should be used. Suitable photoinitiators will be described subsequently.

There is no restriction on the type, blend or concentration of free radical photoinitiators used and can include any of, but not limited to the following (and combinations thereof): α-hydroxyketones such as; 1-hydroxy-cyclohexyl-phenyl-ketone; 2-hydroxy-2-methyl-1-phenyl-1-propanone; 2-hydroxy-2-methyl-4'-tert-butyl-propiophenone; 2-hydroxy-4'-(2-hydroxyethoxy)-2-methyl-propiophenone; 2-hydroxy-4'-(2-hydroxypropoxy)-2-methyl-propiophenone; oligo 2-hydroxy-2-methyl-1-[4-(1-methyl-vinyl)phenyl]propanone; bis[4-(2-hydroxy-2-methylpropionyl)phenyl]methane; 2-Hydroxy-1-[1-[4-(2-hydroxy-2-methylpropanoyl)phenyl]-1,3,3-trimethylindan-5-yl]-2-methylpropan-1-one and 2-Hydroxy-1-[4-[4-(2-hydroxy-2-methylpropanoyl)phenoxy]phenyl]-2-methylpropan-1-one;

acylphosphine oxides such as; 2,4,6-trimethylbenzoyl-diphenylphosphine oxide; ethyl (2,4,6-trimethylbenzoyl) phenyl phosphinate, bis-(2,4,6-trimethylbenzoyl)-phenylphosphine oxide; and bis(2,6-dimethoxybenzoyl)-2,4,4-trimethylpentylphosphinoxide;

α-aminoketone s such as; 2-methyl-1-[4-(methylthio)phenyl]-2-morpholinopropan-1-one; 2-benzyl-2-dimethylamino-1-(4-morpholinophenyl)-butan-1-one; and 2-dimethylamino-2-(4-methyl-benzyl)-1-(4-morpholin-4-yl-phenyl)-butan-1-one;

thioxanthones such as; 2-4-diethylthioxanthone, isopropylthioxanthone, 2-chlorothioxanthone, and 1-chloro-4-propoxythioxanthone;

benzophenones such as; such as benzophenone, 4-phenylbenzophenone, and 4-methylbenzophenone; methyl-2-benzoylbenzoate; 4-benzoyl-4-methyldiphenyl sulphide; 4-hydroxybenzophenone; 2,4,6-trimethyl benzophenone, 4,4-bis(diethylamino)benzophenone; benzophenone-2-carboxy(tetraethoxy)acrylate; 4-hydroxybenzophenone laurate and 1-[-4-[benzoylphenylsulpho]phenyl]-2-methyl-2-(4-methylphenylsulphonyl)propan-1-one;

phenylglyoxylates such as; phenyl glyoxylic acid methyl ester; oxy-phenyl-acetic acid 2-[hydroxyl-ethoxy]-ethyl ester, or oxy-phenyl-acetic acid 2-[2-oxo-2-phenyl-acetoxy-ethoxy]-ethyl ester;

oxime esters such as; 1-phenyl-1,2-propanedione-2-(O-ethoxycarbonyl)oxime; [1-(4-phenylsulfanylbenzoyl)heptylideneamino]benzoate, or [1-[9-ethyl-6-(2-methylbenzoyl)carbazol-3-yl]-ethylideneamino]acetate.

Examples of other suitable photoinitiators include diethoxy acetophenone; benzil; benzil dimethyl ketal; titanocen radical initiators such as titanium-bis(η 5-2,4-cyclopentadien-1-yl)-bis-[2,6-difluoro-3-(1H-pyrrol-1-yl) phenyl]; 9-fluorenone; camphorquinone; 2-ethyl anthraquinone; and the like.

Polymeric photoinitiators and sensitizers are also suitable, including, for example, polymeric aminobenzoates (GENOPOL AB-1 or AB-2 from RAHN, Omnipol ASA from IGM or Speedcure 7040 from Lambson), polymeric benzophenone derivatives (GENOPOL BP-1 or BP-2 from RAHN, Omnipol BP, Omnipol BP2702 or Omnipol 682 from IGM or Speedcure 7005 from Lambson), polymeric thioxanthone derivatives (GENOPOL TX-1 or TX-2 from RAHN, Omnipol TX from IGM or Speedcure 7010 from Lambson), polymeric aminoalkylphenones such as Omnipol 910 from IGM; polymeric benzoyl formate esters such as Omnipol 2712 from IGM; and the polymeric sensitizer Omnipol SZ from IGM.

Since the compositions of the current invention are intended for use in low migration applications printing and coating applications it is preferred that photoinitiators having low migration potential are used. Therefore, polymeric, polymerizable and multifunctional types are preferred.

An amine synergist may also be optionally included in the formulation. Suitable examples include, but are not limited to, the following: Aromatic amines such as; 2-(dimethylamino)ethylbenzoate; N-phenyl glycine; benzoic acid, 4-(dimethylamino)-, 1,1'-[(methylimino)di-2,1-ethanediyl] ester; and simple alkyl esters of 4-(N,N-dimethylamino)benzoic acid, with ethyl, amyl, 2-butoxyethyl and 2-ethylhexyl esters being particularly preferred; other positional isomers of N,N-dimethylamino)benzoic acid esters are also suitable.

Aliphatic amines such as N-methyldiethanolamine, triethanolamine and tri-isopropanolamine.

Also aminoacrylates and amine modified polyether acrylates, including but not limited to; EBECRYL 80, EBECRYL 81, EBECRYL 83, EBECRYL 85, EBECRYL 880, EBECRYL LEO 10551, EBECRYL LEO 10552, EBECRYL LEO 10553, EBECRYL 7100, EBECRYL P115 and EBECRYL P116 available from ALLNEX; CN501, CN550, CN UVA421, CN3705, CN3715, CN3755, CN381 and CN386, all available from Sartomer; GENOMER 5142, GENOMER 5161, GENOMER 5271 and GENOMER 5275 from RAHN; PHOTOMER 4771, PHOTOMER 4967, PHOTOMER 5006, PHOTOMER 4775, PHOTOMER 5662, PHOTOMER 5850, PHOTOMER 5930, and PHOTOMER 4250 all available from IGM, LAROMER LR8996, LAROMER LR8869, LAROMER LR8889, LAROMER LR8997, LAROMER PO 83F, LAROMER PO 84F, LAROMER PO 94F, LAROMER PO 9067, LAROMER PO 9103, LAROMER PO 9106 and LAROMER PO77F, all available from BASF; AGISYN 701, AGISYN 702, AGISYN 703, NeoRad P-81 and NeoRad P-85 ex DSM-AGI.

Compositions according to the invention may comprise any amount of any blend of ethylenically unsaturated, free radically polymerizable monomers and oligomers. It will be appreciated that the term "any blend of ethylenically unsaturated monomers and oligomers" means that the composition can comprise one or more of such monomers and/or one or more of such oligomers, and preferably comprises at least one ethylenically unsaturated monomer and at least one ethylenically unsaturated oligomer. Where the compositions are intended for the printing or coating of food packaging it is preferred that the concentration of monofunctional monomers be less than 20%, preferably less than 10% and most preferably less than 5% by weight of the total composition.

Examples of suitable monofunctional ethylenically unsaturated monomers include but are not limited to the following (and combinations thereof), where the terms ethoxylated refers to chain-extended compounds through the use of ethyleneoxide, propoxylated refers to chain-extended compounds through the use of propylene oxide, and alkoxylated preferably refers to chain-extended compounds using either or both ethyleneoxide and propylene oxide. Equivalent methacrylate compounds are also capable of being used, although those skilled in the art will appreciate that methacrylate compounds have lower reactivity than their equivalent acrylate counterparts:

isobutyl acrylate; cyclohexyl acrylate; iso-octyl acrylate; n-octyl acrylate; isodecyl acrylate; iso-nonyl acrylate; octyl/decyl acrylate; lauryl acrylate; 2-propyl heptyl acrylate; tridecyl acrylate; hexadecyl acylate; stearyl acrylate; iso-stearyl acrylate; behenyl acrylate; tetrahydrofurfuryl acrylate; 4-t.butyl cyclohexyl acrylate; 3,3,5-trimethylcyclohexane acrylate; isobornyl acrylate; dicyclopentyl acrylate; dihydrodicyclopentadienyl acrylate; dicyclopentenyloxyethyl acrylate; dicyclopentanyl acrylate; benzyl acrylate; phenoxyethyl acrylate; 2-hydroxy-3-phenoxypropyl acrylate; alkoxylated nonylphenol acrylate; cumyl phenoxyethyl acrylate; cyclic trimethylolpropane formal acrylate; 2(2-ethoxyethoxy) ethyl acrylate; polyethylene glycol monoacrylate; polypropylene glycol monoacrylate; caprolactone acrylate; ethoxylated methoxy polyethylene glycol acrylate; methoxy triethylene glycol acrylate; tripropyleneglycol monomethyl ether acrylate; diethylenglycol butyl ether acrylate; alkoxylated tetrahydrofurfuryl acrylate; ethoxylated ethyl hexyl acrylate; alkoxylated phenol acrylate; ethoxylated phenol acrylate; ethoxylated nonyl phenol acrylate; propoxylated nonyl phenol acylate; polyethylene glycol o-phenyl phenyl ether acrylate; ethoxylated p-cumyl phenol acrylate; ethoxylated nonyl phenol acrylate; alkoxylated lauryl acrylate; ethoxylated tristyrylphenol acrylate; N-(acryloyloxyethyl)hexahydrophthalimide; N-butyl 1,2 (acryloyloxy) ethyl carbamate; acryloyl oxyethyl hydrogen succinate; octoxypolyethylene glycol acrylate; octafluoropentyl acrylate; 2-isocyanato ethyl acrylate; acetoacetoxy ethyl acrylate; 2-methoxyethyl acrylate; dimethyl amino-ethyl acrylate; 2-carboxyethyl acrylate; 4-hydroxy butyl acrylate.

Where monomers are used in the preparation of inventive compositions it is preferable that they be multifunctional with respect to their polymerizable groups. Multifunctional monomers, having 2 or more ethylenically unsaturated groups, such as acrylate, have a greater probability of reacting into the UV-cured ink or coating compared with a monofunctional monomer, thereby reducing the risk of potential contamination arising from uncured monomer. Examples of suitable multifunctional ethylenically unsaturated monomers include but are not limited to the following (and combinations thereof), where the terms ethoxylated refers to chain-extended compounds through the use of ethyleneoxide, propoxylated refers to chain-extended compounds through the use of propylene oxide, and alkoxylated preferably refers to chain-extended compounds using either or both ethyleneoxide and propylene oxide. Equivalent methacrylate compounds are also capable of being used, although those skilled in the art will appreciate that methacrylate compounds have lower reactivity than their equivalent acrylate counterparts:

1,3-butylene glycol diacrylate; 1,4-butanediol diacrylate; neopentyl glycol diacrylate; ethoxylated neopentyl glycol diacrylate; propoxylated neopentyl glycol diacrylate; 2-methyl-1,3-propanediyl ethoxy acrylate; 2-methyl-1,3-propanediol diacrylate; ethoxylated 2-methyl-1,3-propanediol diacrylate; 3 methyl 1,5-pentanediol diacrylate; 2-butyl-2-ethyl-1,3-propanediol diacrylate; 1,6-hexanediol diacrylate; alkoxylated hexanediol diacrylate; ethoxylated hexanediol diacrylate; propoxylated hexanediol diacrylate; 1,9-nonanediol diacrylate; 1,10 decanediol diacrylate; ethoxylated hexanediol diacrylate; alkoxylated hexanediol diacrylate; diethyleneglycol diacrylate; triethylene glycol diacrylate; tetraethylene glycol diacrylate; polyethylene glycol diacrylate; propoxylated ethylene glycol diacrylate; dipropylene glycol diacrylate; tripropyleneglycol diacrylate; polypropylene glycol diacrylate; poly (tetramethylene glycol) diacrylate; cyclohexane dimethanol diacrylate; ethoxylated cyclohexane dimethanol diacrylate; alkoxylated cyclohexane dimethanol diacrylate; polybutadiene diacrylate; hydroxypivalyl hydroxypivalate diacrylate; tricyclodecanedimethanol diacrylate; 1,4-butanediylbis[oxy(2-hydroxy-3,1-propanediyl)]diacrylate; ethoxylated bisphenol A diacrylate; propoxylated bisphenol A diacrylate; propoxylated ethoxylated bisphenol A diacrylate; ethoxylated bisphenol F diacrylate; 2-(2-Vinyloxyethoxy)ethyl acrylate; dioxane glycol diacrylate; ethoxylated glycerol triacrylate; glycerol propoxylate triacrylate; pentaerythritol triacrylate; trimethylolpropane triacrylate; caprolactone modified trimethylol propane triacrylate; ethoxylated trimethylolpropane triacrylate; propoxylated trimethylol propane triacrylate; tris (2-hydroxy ethyl) isocyanurate triacrylate; e-caprolactone modified tris (2-hydroxy ethyl) isocyanurate triacrylate; melamine acrylate oligomer; pentaerythritol tetraacrylate; ethoxylated pentaerythritol tetraacrylate; di-trimethylolpropane tetra acrylate; dipentaerythritol pentaaacrylate; dipentaerythritol hexaacrylate; ethoxylated dipentaerythritol hexaacrylate.

Examples of monomers comprising free-radically polymerizable groups other than acrylate include N-vinyl amides. Examples of N-vinyl amides include but are not limited to N-vinylcaprolactam (NVC), N-vinyl pyrollidone (NVP), diacetone acrylamide, N-vinyl carbazole, N-acryloxyoxy ethylcyclohexanedicarboximide, N-vinyl imidazole, N-vinyl-N-methylacetamide (VIMA) or acryloyl morpholine (ACMO). Vinyl ethers such as 2-(2-vinyloxyethoxy)ethyl (meth)acrylate (VEEA, VEEM), diethylene glycol divinyl ether (DVE2), triethylene glycol divinyl ether (DVE3), ethyl vinyl ether, n-butyl vinyl ether, iso-butyl vinyl ether, tert-butyl vinyl ether, cyclohexyl vinyl ether (CHVE), 2-ethylhexyl vinyl ether (EHVE), dodecyl vinyl ether (DDVE), octadecyl vinyl ether (ODVE), 1-2-butanediol divinyl ether (BDDVE), 1-4,cyclohexanedimethanol divinylether (CHDM-di), hydroxybutyl vinylether (HBVE), 1-4-cyclohexanedimethanolmono vinylether (CHDM-mono), 1,2,4-trivinylcyclohexane (TVCH), vinylphosphonic acid dimethylester (VPA) or vinylphosphonic acid dimethyl ester (VPADME).

As well as, or in place of, free radically-polymerizable monomers any concentration and type of free-radically polymerizable oligomer, including but not restricted to polyurethane acrylates, polyester acrylates, polyether acrylates and epoxy acrylates may be used. Epoxy acrylates are an especially preferred class of material as these are substances encompassed by the invention.

Where the compositions of the invention require colourants, suitable colorants include, but are not limited to organic or inorganic pigments and dyes. The dyes include but are not limited to azo dyes, anthraquinone dyes, xanthene dyes, azine dyes, combinations thereof and the like. Organic pigments may be one pigment or a combination of pigments, such as for instance Pigment Yellow Numbers 12, 13, 14, 17, 74, 83, 114, 126, 127, 150, 155, 174, 180, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36, 71; Pigment Blue Numbers 15, 15:3, 15:4; Pigment Violet Numbers 3, 19, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors desired.

The energy-curable compositions of the invention may also contain other components which enable them to perform in their intended application. These other ink components include, but are not restricted to; stabilizers, wetting aids, slip agents, inert resins, antifoams, fillers, rheological aids, amine synergists, etc.

The compositions of the invention may also optionally comprise any blend of acrylic polymer or copolymer which is dissolved into it. These polymers are usually prepared by the (thermal) free radical polymerization of blends of monomers including, but not restricted to, styrene, butyl (meth)acrylate, ethyl (meth)acrylate, methyl (meth)acrylate, isobutyl (meth)acrylate. The acrylic polymer preferably has a number average molecular weight of less than 20,000 g/mole and more preferably less than 10,000 g/mole. The molecular weight of such polymers can be measured by those techniques known in the art such as gel permeation chromatography. Examples of acrylic polymers include those supplied from Dianal, Elvacite Rohm and Haas and DSM, amongst others. The acrylic polymer is preferably present in the compositions at a concentration of between 2 and 20% (w/w).

Compositions of the current invention are preferably essentially free of any aprotic solvent, and protic solvents with boiling points of less than 150° C. However, if required, compositions of the current invention can be diluted with such solvents. Both organic and aqueous solvents may be used to dilute the curable compositions of the invention. The preferred maximum amount of any solvent that could be included in an ink composition is 10% (w/w).

The compositions prepared according to the invention are particularly suited to the preparation of inkjet, flexographic and offset printing inks and coatings.

Where compositions according to the invention are intended for the printing or coating of food packaging or other sensitive applications, such as pharmaceutical packaging then if they incorporate photoinitiators then those photoinitiators having low migration potential should preferably be used. Any combination and concentration of low migration potential photoinitiators may be used and types include, but are not restricted to; polymeric, polymerizable, difunctional, multifunctional photoinitiators. Both type I and type II photoinitiators within those classes are suitable. Suitable polymeric photoinitiators have previously been described. Other photoinitiators suitable for low migration applications include, 1-[4-(2-Hydroxyethoxy)-phenyl]-2-hydroxy-2-methyl-1-propane-1-one, Oligo-[2-Hydroxy-2-methyl-1-((4-(1-methylvinyl)phenyl)propanone], Poly(oxy-1,2 ethanedyil)-alpha-(4-(dimethylamino)benzoyl)-omega-((4-(dimethylamino)benzoyl)oxy)-(9Cl), 2-Hydroxy-1-{4-[4-(2-hydroxy-2-methyl-propionyl)-benzyl]-phenyl}-2-methyl-propan-1-one, 2-hydroxy-1-[4-(4-(2-hydroxy-2-methylpropionyl)phenoxy)phenyl]-2-methyl propan-1-one. Photoinitiators which are suitable for low migration may include any of those listed in EUPIA's 'Suitability List of Photo-initiators for Low Migration UV Printing Inks and Varnishes', especially those in Group 1A and 1B. Any UV light source can be used including, but not limited to, UV-LED (including but not limited to those emitting UV light at 355, 365, 377, 385, 395 and 405 nm), high-pressure mercury bulb, a medium-pressure mercury bulb, a xenon bulb, a carbon arc lamp, a metal halide bulb, or sunlight. It should be appreciated by those skilled in the art that any UV light source may be used to cure compositions prepared according to the current invention.

A stabilizer may also be used in the composition to ensure good pot life of the ink, examples of which are nitroxy based stabilizers such as OHTEMPO, TEMPO, and Irgastab UV10. Phenolic stabilizers such as hydroquinone (HQ), methyletherhydroquinone (MEHQ), butylhydroxytoluene (BHT) and 2,6-di-tert-butyl-N,N-dimethylamino-p-cresol. Nitrosophenylhydroxylamine (NPHA) base inhibitors NPHA, amine salts, and metal salts (Al salt, N-PAL) plus the aromatic amine inhibitors diphenylamine (DPA) and phenylenediamine (PPD). Other suitable stabilizers are florstab UV-1, UV-8, Genorad 16 and 18.

Included in the ink formulation can be a suitable de-aerator, these prevent the formation of air inclusions and pinholes in the cured coating. These also reduce rectified diffusion which can cause reliability issues in the printhead. The following, non-limiting, products are available from EVONIK: TEGO AIREX 900, 910, 916, 920, 931, 936, 940, 944, 945, 950, 962, 980, 986.

Defoamers can also be included in the formulation, these prevent the formation of foam during manufacture of the ink and also while jetting. These are particularly important with recirculating printheads. Suitable, non-limiting, defoamers include TEGO FOAMEX N, FOAMEX 1488, 1495, 3062, 7447, 800, 8030, 805, 8050, 810, 815N, 822, 825, 830, 831, 835, 840, 842, 843, 845, 855, 860, 883, TEGO FOAMEX K3, TEGO FOAMEX K7/K8 and TEGO TWIN 4000 available from EVONIK. Available from BYK is BYK-066N, 088, 055, 057, 1790, 020, BYK-A 530, 067A, and BYK 354.

Surface Control Additives are often used to control the surface tension of the ink which is required to adjust the wetting on the face plate of the printhead and also to give the desired drop spread on the substrate or and in the case of multi pass inkjet printing wet on dry drop spread. They can also be used to control the level of slip and scratch resistance of the coating. Suitable surface control additives include but are not limited to TEGO FLOW300, 370, 425, TEGO GLIDE 100, 110, 130, 406, 410, 411, 415, 420, 432, 435, 440, 482, A115, B1484, TEGO GLIDE ZG 400, TEGO RAD2010, 2011, 2100, 2200N, 2250, 2300, 2500, 2600, 2650, 2700, TEGO TWIN 4000, 4100, TEGO WET 240, 250, 260, 265, 270, 280, 500, 505, 510 and TEGO WET KL245 all available from EVONIK. Available from BYK are BYK 333, 337, BYK UV3500, BYK 378, 347, 361, BYK UV3530, 3570, CERAFLOUR 998, 996, NANOBYK 3601, 3610, 3650 and CERMAT 258. From CYTEC EBECRYL 350, 1360, MODAFLOW 9200, EBECRYL 341. From SARTOMER the aliphatic silicone acrylate CN9800 may be used.

Where ink and coating compositions are applied to the (non-contact) surface of primary or secondary packaging intended for foodstuffs, then any contamination from the package impacting the foodstuff should fall within the guidelines set out by Article 3 of Regulation (EC) No 1935/2004 (supplemented by EC No 10/2011), as recommended by EUPIA, requiring that materials and articles in contact with food;

"shall be manufactured in accordance with good manufacturing practices, so that under normal or foreseeable conditions of use, they do not transfer their constituents to food in quantities which could:
  endanger human health; or
  bring about an unacceptable change in the composition of the food; or
  bring about a deterioration in the organoleptic characteristics thereof"

EUPIA has recommended that Article 3 of this provision be followed when producing printed matter for food packaging and has produced a detailed guideline for the selection of raw materials intended for printing inks for food packaging, along with guidelines on the testing of printed matter to ensure that regulatory requirements are achieved. Where no SML exists for a specific component then the following migration limits apply;

"A target migration limit of no concern for non-evaluated substances of 10 ppb is the ultimate objective, to be consistent with other food contact materials.

In particular, a substance is acceptable if its specific migration does not exceed:
  10 ppb, in case of insufficient toxicological data
  50 ppb if three negative mutagenicity tests requested by EFSA4 Guidelines are available
  above 50 ppb, if supported by favorable toxicological data and/or evaluation done in accordance with the EFSA Guidelines" (Extract from EuPIA Guideline on Printing Inks applied to the non-food contact surface of food packaging materials and articles, September 2009).

EUPIA also provides guidelines on how to measure the potential level of migratables arising from printed matter. For inks and coatings applied to the non-food contact surface of packaging (i.e. the outer surface), whether that be to the primary packaging or secondary packaging (labels and sleeves) then the most likely route for migratable species from the ink contaminating the foodstuff is by what is known as set-off migration. This is where printed matter is stacked or reeled prior to it being filled with food. Thus, the ink comes into contact with what will be the food-contact surface of the package and migratable components of the ink can diffuse into this surface. When the package is then filled with foodstuff, the contaminants from the ink which have diffused into the contact-surface of the package can then leach into the food causing a potential contamination issue.

Thus, any energy-curable fluid which is applied to either the primary or secondary packaging of foodstuff should not result in contamination of that foodstuff at levels exceeding the limits detailed above.

According to a further aspect of the present invention there is provided a process for preparing a printed substrate comprising printing the composition as defined hereinabove onto a substrate and curing. To effect curing, the composition may be exposed to both UV and EB radiation. For instance the composition may be partially cured using any combination of UV-LED lamps, prior to EB-curing. In a particularly preferred embodiment, the composition is cured by EB radiation. It will be appreciated that the foregoing description of the other aspects of the invention, including the preferences thereof, is equally applicable to this aspect of the invention too.

According to a further aspect of the present invention there is provided a printed article comprising a composition as defined hereinabove and/or which is obtainable by the printing process as defined hereinabove. Thus, it will be appreciated that the printed article in particular comprises a cured coating derived from a curable composition as defined hereinabove. The substrate of the printed article is preferably a plastic film. The printed article is preferably a food packaging article. It will be appreciated that the foregoing description of the other aspects of the invention, including the preferences thereof, is equally applicable to this aspect of the invention too.

According to a further aspect of the invention, there is provided a method of reducing the amount of uncured monomer in a cured ink or coating composition comprising applying the composition as defined herein to a substrate and curing. It will be appreciated that said reduction of the amount of uncured monomer is relative to a cured ink or coating composition which does not comprise the partially acrylated polyols defined herein. It will be appreciated that the foregoing description of the other aspects of the invention, including the preferences thereof, is equally applicable to this aspect of the invention too.

According to a further aspect of the invention, there is provided the use of partially acrylated polyols to promote the energy-cure (preferably UV and/or electron beam cure) of free-radically polymerizable compositions. The foregoing description of all the other aspects of the invention, including the preferences thereof, is equally applicable to this aspect of the invention too.

The invention is further described by the following numbered embodiments:
1. Energy-curable compositions comprising a partially acrylated polyol according to the general expression:

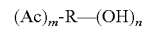

where;
Ac=An acrylate (or methacrylate) group;
$m+n \geq 2$;
$m \geq 1$;
$n \geq 1$; and
R=any organic residue.
2. The composition according to embodiment 1, wherein less than 75% of the alcohols of the polyol are acrylated.
3. The composition according to embodiment 1, wherein less than 50% of the alcohols of the polyol are acrylated.

4. The composition according to any preceding embodiment, wherein the polyol used in the preparation of the partially acrylated polyol is a poly(alkoxylated) polyol.
5. The composition according to embodiment 4, wherein the polyol is selected from the group consisting of ethoxylated or propoxylated adducts of trimethylolpropane, glycerol, pentaerythritol, ditrimethylolpropane, dipentaerythritol and blends thereof.
6. The composition according to embodiment 5, wherein the average degree of alkoxylation per alcohol group is greater than 1.
7. The composition according to any preceding embodiment, further comprising any blend of photoinitiators.
8. The composition according to any preceding embodiment which is UV-curable.
9. The composition according to any preceding embodiment which is EB-curable.
10. The composition according to any preceding embodiment which is cured by exposure to both UV and EB radiation.
11. The composition according to any preceding embodiment, wherein the polyol compound used to prepare the partially acrylated polyol has a molecular weight of less than 5,000, more preferably less than 2,500 and most preferably less than 1,500 g/mol.
12. The composition according to any preceding embodiment, wherein the partially acrylated polyol provides an equivalent hydroxy value of 2.5 mgKOH/g, or greater, preferably 5.0 mgKOH/g, or greater.
13. The composition according to any preceding embodiment which is a pigmented inkjet ink.
14. The composition according to embodiment 1-13 which is a pigmented flexo ink.
15. The composition according to embodiment 1-13 which is a pigmented offset ink.
16. A printed substrate produced by applying the composition according to any preceding embodiment onto a substrate and curing the composition.
17. The printed substrate of embodiment 16, wherein the substrate is a plastic film.
18. The printed substrate of embodiment 16, wherein the substrate is a food packaging article.
19. A method of reducing the amount of uncured monomer in a cured ink or coating film comprising applying the composition of any one or more of embodiments 1-15 onto a substrate and curing the composition(s).

The present invention has been described in detail, including the preferred embodiments thereof. However, it will be appreciated that those skilled in the art, upon consideration of the present disclosure, may make modifications and/or improvements on this invention that fall within the scope and spirit of the invention.

EXAMPLES

The following examples illustrate specific aspects of the present invention and are not intended to limit the scope thereof in any respect and should not be so construed. These examples are illustrative and are not to be read as limiting the scope of the invention as it is defined by the appended claims.

Viscosity Measurements were taken using a Brookfield DV-II+Pro Viscometer equipped with Spindle no. 18, at 100 rpm.

Curing the Inks for Extraction Testing—The inks were applied to 23 µm Melinex 813 (a polyester film) at 10 µm, unless otherwise stated, and then cured 150 mJ/cm$^2$, using a Fusion UV Systems UV-Rig equipped with a medium pressure H-bulb. The belt speed was adjusted to deliver the required UV-dose of 150 mJ/cm$^2$, as measured by a calibrated International Light Technologies ILT 490 Profiling Belt Radiometer (covering the UV-A and UV-B ranges).

Assessing the Level of Extractable Monomer—The levels of unbound, unreacted monomer residues in a print were determined by a 'total extraction' test. This test involved soaking 30 cm$^2$ of the print in 2 ml of methanol, containing 0.005% (w/w) of MEHQ (stabilizer) for 24 hours at room temperature before the methanol solution was analyzed by GC-MS. The GC-MS was calibrated with known solutions of the monomers and the results are reported as the amount of uncured monomer per unit area of print, expressed as µg/dm$^2$.

Preparation of Partially Acrylated Polyol

A 1-1 four-necked round bottom flask fitted with a Dean-Stark trap, condenser, thermometer, gas inlet (used for air sparge with Teflon pipe) and a mechanical stirrer was charged with 150.00 g (0.18 mol) polyol R6405 (a hexafunctional alkoxylated polyol with primary hydroxyl groups; product of Perstorp group, Sweden; OH-value: 405 mgKOH/g), 0.1 g 4-methoxyphenol, 0.01 g phenothiazine (both polymerization-inhibitors) and 0.3 g 4-toluene sulfonic acid (p-TSA, catalyst). 50 ml n-Heptane was added to the Dean-Stark bridge (with about 25 ml entering the reaction mixture). Air was bubbled through the clear reaction mixture and the reaction mixture was heated to reflux (90-110° C.). 39 g (0.54 mol) acrylic acid was then added dropwise to the mixture under stirring.

The water produced during the esterification reaction separated into the Dean-Stark bridge during the course of the reaction. The decrease of the acid number was monitored during the reaction to enable a determination of when the reaction was complete. When the acid value fell below 5 mg KOH/g the reaction mixture was allowed to cool to 60-80° C. and a vacuum (100 mbar) applied to remove any volatile matter from the product. A slightly bluish, viscous liquid was obtained.

Yield: 150 g
Viscosity: 538 mPa·s @25° C., 50 s$^{-1}$.
OH-value: 262.7 mgKOH/g (measured by titration)
NMR: From integration of the corresponding $^1$H-NMR signals an acrylation degree of 27% is calculated (100% means all OH-groups are acrylated).

The analysis of this partially acrylated polyol suggests the following structure. As such, it meets the requirements laid out by the general expression requirement of the invention.

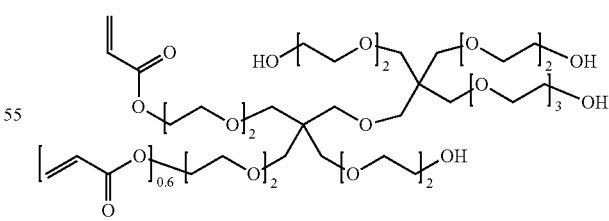

Ink Examples

Use of Partially Acrylated Polyol to Enhance UV Surface Cure

To show how the partially acrylated polyol above can be used to promote surface cure, in air, the following inkjet compositions were prepared. The inks were blended using a Silverson high shear mixer.

TABLE 1

UV-LED Curable Inkjet Compositions Showing the Benefit of the Inclusion of a Partially Acrylated Polyol

| Material | Comp. Example 1 | Comp. Example 2 | Inv. Example 1 | Inv. Example 2 | Inv. Example 3 |
|---|---|---|---|---|---|
| VEEA[1] | 30.0 | 30.0 | 30.0 | 30.0 | 30.0 |
| HDDA[2] | 35.0 | 35.0 | 35.0 | 35.0 | 35.0 |
| TMPEOTA[3] | 15.0 | 10.0 | 10.0 | 5.0 | — |
| CN3715[4] | 4.0 | 4.0 | 4.0 | 4.0 | 4.0 |
| DiPenta(EO)13[5] | — | 5.0 | — | — | — |
| Partially Acrylated Polyol[6] | — | — | 5.0 | 10.0 | 15.0 |
| BAPO[7] | 3.0 | 3.0 | 3.0 | 3.0 | 3.0 |
| DETX[8] | 3.0 | 3.0 | 3.0 | 3.0 | 3.0 |
| TegoGlide 410[9] | 1.0 | 1.0 | 1.0 | 1.0 | 1.0 |
| Cyan Pigment Dispersion[10] | 9.0 | 9.0 | 9.0 | 9.0 | 9.0 |
| Total | 100 | 100 | 100 | 100 | 100 |
| Viscosity @ 45° C. (mPa·s) | 5.49 | 5.91 | 5.94 | 6.39 | 8.25 |
| Hydroxy Value Contributed by Polyol (mgKOH/g ink) | — | 20.4 | 13.2 | 26.3 | 39.5 |

Notes to Table 1:
[1]VEEA = 2-(2-vinyloxyethoxy)ethyl acrylate;
[2]HDDA = Hexanediol Diacrylate;
[3]TMPEOTA = Trimethylolpropane ethoxylate triacrylate (3 moles ethoxylation);
[4]CN3715 = Acrylated Amine, ex. Sartomer;
[5]DiPenta(EO)13 = Ethoxylated dipentaerythritol;
[6]Polyol R6405, ex. Perstorp;
[7]BAPO = Irgacure 819, ex. IGM Resins;
[8]DETX = 2,4-diethylthioxanthone;
[9]Tego Glide 410 = silicone polyether surfactant, ex. Evonik;
[10]Cyan Dispersion = a proprietary dispersion containing 25.0% (w/w) of Pigment 15:4, the remainder comprising the dispersant, stabilizers and DPGDA (dipropyleneglycol diacrylate).

The inks were applied to Leneta Form 2A test cards at 10 µm, using an appropriate K-Bar (ex. RK Print). The cure response was assessed as being the maximum belt speed that could be achieved through a Nordson belt conveyor, equipped with a Phoseon 14W 395 nm UV-LED lamp whilst maintaining satisfactory surface cure. Surface cure was assessed by drawing a cotton wool bud over the cured ink surface and assessing the print surface for any defects. Prints where the surface showed no defects were deemed to have achieved satisfactory surface cure. Table 2 provides the maximum conveyor speed achieved by each ink of Table 1 in delivering satisfactory surface cure.

TABLE 2

Improving the surface cure of UV-LED Curable Inkjet Compositions through the incorporation of partially acrylated polyol

| Ink | Maximum Speed whilst Maintaining Surface Cure (m/min) |
|---|---|
| Comp. Example 1 | 20 |
| Comp. Example 2 | 25 |
| Inv. Example 1 | 40 |
| Inv. Example 2 | 40 |
| Inv. Example 3 | 50 |

It is clear from Table 2 that the inks comprising the partially acrylated polyol were able to deliver significantly faster surface cure than the comparative examples. This is a most surprising and useful finding as it would be anticipated that a monomer with less than an average of 2 acrylate groups per molecule would not promote the cure so significantly, especially at the expense of the trifunctional TMPEOTA. For the ink comprising the ethoxylated dipentaerythritol, Comparative Example 2, there was no issue with surface cure at 20 m/min, but at 25 m/min, the print surface defect was most probably due to a bloom of polyol since the cotton wool bud was not stained with any cyan pigment whereas in the case of Comparative Example 1 poor surface cure was associated with a staining of the cotton wool bud. This raises the issue with the use of non-acrylated polyols; a bloom of unbound polyol to the print surface resulting in smeary cured print surfaces.

To show the impact of partially acrylated polyols on the reduction of the amount of unreacted monomer during UV-cure the following inks were prepared and tested according to the extraction method previously described. The amounts of extractable DPGDA, VEEA and 3-MePDDA (3-Methylpentandiol diacrylate), along with the ink formulations are reported in Table 3.

TABLE 3

UV-Curable Inkjet Compositions comprising partially acrylated polyol

| | Comp. Example 3 | Comp. Example 4 | Comp. Example 5 | Comp. Example 6 | Comp. Example 7 | Comp. Example 8 | Inv. Example 4 |
|---|---|---|---|---|---|---|---|
| VEEA | 30.0 | 30.0 | 30.0 | 30.0 | 30.0 | 30.0 | 30.0 |
| 3-MePDDA | 40.0 | 40.0 | 40.0 | 40.0 | 40.0 | 40.0 | 40.0 |
| TMPEOTA | 11.0 | 8.5 | 6.0 | 6.0 | 1.0 | 6.0 | 1.0 |
| CN3715 | 3.5 | 3.5 | 3.5 | 3.5 | 3.5 | 3.5 | 3.5 |
| DiPETA(EO)13 | — | 2.5 | 5.0 | — | — | — | — |
| Komerate M136[1] | — | — | — | 5.0 | 10.0 | — | — |
| HBA[2] | — | — | — | — | — | 7.5 | — |
| Partially Acrylated Polyol | — | — | — | — | — | — | 10.0 |
| BAPO | 0.5 | 0.5 | 0.5 | 0.5 | 0.5 | 0.5 | 0.5 |
| KIP160[3] | 2.0 | 2.0 | 2.0 | 2.0 | 2.0 | 2.0 | 2.0 |
| Irg. 127[4] | 2.0 | 2.0 | 2.0 | 2.0 | 2.0 | 2.0 | 2.0 |
| TegoGlide 410 | 2.0 | 2.0 | 2.0 | 2.0 | 2.0 | 2.0 | 2.0 |
| Cyan Pigment Dispersion | 9.0 | 9.0 | 9.0 | 9.0 | 9.0 | 9.0 | 9.0 |
| Total | 100 | 100 | 100 | 100 | 100 | 100 | 100 |
| Viscosity @ 45° C. (mPa.s) | 5.34 | 5.61 | 6.00 | 5.88 | 6.15 | 5.94 | 6.33 |
| Hydroxy Value Contributed by Polyol (mgKOH/g (ink)) | — | 10.2 | 20.4 | — | — | 13.1 | 26.3 |

TABLE 3-continued

UV-Curable Inkjet Compositions comprising partially acrylated polyol

| | Comp. Example 3 | Comp. Example 4 | Comp. Example 5 | Comp. Example 6 | Comp. Example 7 | Comp. Example 8 | Inv. Example 4 |
|---|---|---|---|---|---|---|---|
| Extractable Monomer (µg/dm$^2$) | | | | | | | |
| DPGDA | 7.9 | 3.8 | 1.1 | 12.5 | 9.0 | 10.7 | 1.5 |
| 3-MePDDA | 42.0 | 18.3 | 5.1 | 27.0 | 20.2 | 53.3 | 5.9 |
| VEEA | 73.0 | 22.7 | 4.9 | 26.3 | 16.5 | 54.7 | 7.4 |

Notes to Table 3:
[1]Komerate M136 = Fully acrylated derivative of DiPeta(EO)13, ex. Green Chemical;
[2]HBA = 4-Hydroxybutyl acrylate;
[3]KIP160 = Esacure KIP160, ex. IGM Resins;
[4]Irg. 127 = Irgacure 127, ex. IGM Resins The results in Table 3 show the effectiveness of a polyol, in this case DiPeta(EO)13 to reduce the amount of uncured monomer as detected by the extraction method detailed herein, Comparative Examples 4 and 5. Although no bloom of the polyol was observed in Comparative Example 4, when the concentration of the polyol was increased to 5.0%, Comparative Example 5, there was a noticeable bloom of the polyol at the print surface. Comparative Example 8, comprising 4-hydroxybutyl acrylate (HBA), a monomer comprising a single hydroxy and single acrylate group showed no significant impact in lowering the amount of uncured monomer. HBA is the basis of the electron-beam curable compositions revealed in WO2017151137. The partially acrylated polyol containing Inventive Example 4 not only showed a significant lowering of the amount of unreacted monomer compared with Comparative Example 3 but also a significantly lower amount of uncured monomer compared with inks prepared using the fully acrylated derivative of DiPeta(EO)13, Comparative Examples 6 and 7. Furthermore, no evidence of any bloom was apparent, a significant advantage over the use of non-acrylated polyols. It should be understood, however, that partially acrylated polyols of the invention may be blended with low concentrations of non-acrylated polyols to gain potentially further benefit in the reduction of uncured monomer. A further benefit observed with Inventive Example 4 compared with Comparative Examples 3, 6 and 7 was that it did not produce as much curl of the printed PET film after cure, indicative of lower shrinkage during cure.

To demonstrate further the benefit of the concentration of the partially acrylated polyol, Inventive Examples 5, 6, 7 and 8 were prepared, comprising 2.5, 5.0, 15.0 and 20.0% of the partially acrylated polyol. These compositions were prepared according to Inventive Example 4, but with a commensurate increase in the concentration of TMPEOTA for Inventive Examples 5 and 6 and a commensurate reduction in TMPEOTA and 3-MePDDA in the case of Inventive Examples 7 and 8. The amounts of extracted monomer for cured prints of these inks are shown alongside those of Comparative Example 3 in Table 4.

TABLE 4

Impact of Partially Acrylated Polyol Concentration on Extracted, Uncured, Monomer from UV-cured prints

| | Comp. Example 3 | Inv. Example 5 | Inv. Example 6 | Inv. Example 4 | Inv. Example 7 | Inv. Example 8 |
|---|---|---|---|---|---|---|
| % (w/w) Partially Acrylated Polyol | — | 2.5 | 5.0 | 10.0 | 15.0 | 20.0 |
| Viscosity @ 45° C. (mPa.s) | 5.34 | 5.64 | 5.94 | 6.33 | 7.56 | 11.8 |
| Hydroxy Value Contributed by Polyol (mgKOH/g (ink)) | 0 | 6.6 | 13.2 | 26.3 | 39.5 | 52.6 |
| Extractable Monomer (µg/dm$^2$) | | | | | | |
| DPGDA | 7.9 | 3.6 | 3.4 | 1.5 | 0.5 | <0.5 |
| 3-MePDDA | 42.0 | 15.6 | 15.2 | 5.9 | 2.1 | <0.5 |
| VEEA | 73.0 | 17.3 | 11.0 | 7.4 | 2.0 | <0.5 |

The results in Table 4 show that even when used at a concentration as low as 2.5% (w/w) the acrylated polyol has a most profound impact in reducing the amount of uncured monomer during UV-cure. As mentioned previously the capacity of polyol compounds, and more specifically the partially acrylated polyols of the current invention, to enhance cure has not been previously revealed in the references and is a most surprising and unpredicted finding.

To show that partially acrylated polyols also have an impact in EB-curing, inkjet compositions according to those in Table 5 were prepared. The inks were applied to the PET film in the manner previously described but were cured using an EBeam Technologies EBLab with a dose of 35 kGy and an accelerating voltage of 100 keV, at an oxygen level of less than 200 ppm. The amount of uncured monomer in each ink print was determined using the method previously described.

TABLE 5

EB-Curable Inkjet Compositions Comprising Partially Acrylated Polyols

|  | Comp. Ex. 8 | Comp. Ex. 9 | Comp. Ex. 10 | Comp. Ex. 11 | Comp. Ex. 12 | Inv. Ex. 9 | Inv. Ex. 10 | Inv. Ex. 11 |
|---|---|---|---|---|---|---|---|---|
| VEEA | 30.0 | 30.0 | 30.0 | 30.0 | 30.0 | 30.0 | 30.0 | 30.0 |
| 3-MePDDA | 35.0 | 35.0 | 35.0 | 35.0 | 35.0 | 35.0 | 35.0 | 35.0 |
| TMPEOTA | 21.0 | 11.0 | 16.0 | 11.0 | 11.0 | 16.0 | 11.0 | 6.0 |
| CN3715 | 4.0 | 4.0 | 4.0 | 4.0 | 4.0 | 4.0 | 4.0 | 4.0 |
| HBA | — | 10 | — | — | — | — | — | — |
| DiPETA(EO)13 | — | — | 5.0 | — | — | — | — | — |
| DPHA[1] | — | — | — | 10.0 | — | — | — | — |
| M136 | — | — | — | — | 10.0 | — | — | — |
| Partially Acrylated Polyol | — | — | — | — | — | 5.0 | 10.0 | 15.0 |
| TegoGlide 410 | 1.0 | 1.0 | 1.0 | 1.0 | 1.0 | 1.0 | 1.0 | 1.0 |
| Cyan Pigment Dispersion | 9.0 | 9.0 | 9.0 | 9.0 | 9.0 | 9.0 | 9.0 | 9.0 |
| Total | 100 | 100 | 100 | 100 | 100 | 100 | 100 | 100 |
| Viscosity @ 45° C. (mPa.s) | 5.16 | 4.47 | 5.61 | 6.09 | 5.73 | 5.94 | 6.36 | 7.02 |
| Hydroxy Value Contributed by Polyol (mgKOH/g (ink)) | 0 | 39.0 | 20.4 | 0 | 0 | 13.2 | 26.3 | 39.5 |
| Extractable Monomer (µg/dm²) | | | | | | | | |
| DPGDA | 10.1 | 7.2 | 2.4 | 19.8 | 4.7 | 1.8 | 0.5 | 0.5 |
| 3-MePDDA | 23.2 | 17.8 | 6.0 | 55.0 | 12.4 | 3.3 | 0.8 | 0.7 |
| VEEA | 11.4 | 18.8 | 6.4 | 69.2 | 12.4 | 2.4 | 0.7 | 0.7 |
| HBA | — | 14.2 | — | — | — | — | — | — |

Notes to Table 5:
[1]DPHA = Dipentaerythritol hexaacrylate

The results in Table 5 confirm that the use of partially acrylated polyols lead to a dramatic lowering of the amount of uncured monomer after energy curing, in this case under the impact of electron beam radiation. A key advantage of the use of electron beam is that it does not require the use of photoinitiators to initiate the cure, which would be advantageous in applications requiring low migration. However, the invention also encompasses compositions comprising low concentrations of photoinitiators that may be cured by a combined UV and EB process, as revealed in WO2017180491 and WO2017180496.

Comparative Example 9, comprising 4-hydroxybutyl acrylate, as revealed in WO2017151137 produced no significant lowering of the amount of uncured monomer. This finding supports the benefit of using the partially acrylated polyols of the invention where the sum of alcohol and acrylate groups is greater than 2.

It is interesting to note the difference between Comparative Examples 11 and 12, which show the dramatic effect of the choice of the polyol core. Where the non-ethoxylated hexafunctional monomer, DPHA, was used, there was an apparent increase in the amount of uncured monomer. The equivalent monomer with 13 moles of ethoxylation, Comparative Example 12, produced a significant lowering of the amount of uncured monomer not only compared with Comparative Example 11 but also compared with the control composition, Comparative Example 8. This supports the findings revealed in WO2015148094 where it was shown that highly alkoxylated monomers produced a reduction in the amount of uncured monomer in UV-curable inkjet compositions. This finding, combined with the positive results with the non-acrylated polyol, DiPeta(EO)13 indicates that preferred polyol cores used to prepare the partially acrylated polyols of the invention should preferably be alkoxylated, with a degree of alkoxylation per poly(alkoxylate) chain of at least 1.

The extent to which the partially acrylated polyol of DiPeta(EO)13 of the invention can reduce the amount of uncured monomer during EB-cure, Inventive Examples 9 to 11, is dramatic, with even an incorporation of 5.0% producing a greater than 70% reduction in uncured monomer levels compared with the control, Comparative Example 8.

What is claimed is:

1. An energy-curable composition comprising:
   a) one or more monofunctional or multifunctional free-radically polymerizable ethylenically unsaturated monomer and/or oligomer; and
   b) a partially acrylated polyol according to the general expression;

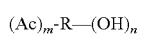

where;
   Ac=an acrylate or methacrylate group;
   $m+n \geq 2$;
   $m \geq 1$;
   $n \geq 1$; and R=any organic residue, wherein the polyol is selected from any of trimethylolpropane, glycerol, pentaerythritol, ditrimethylolpropane, dipentaerythritol and blends thereof and wherein the polyol used in the preparation of the partially acrylated polyol is a poly(alkoxylated) polyol, and wherein the energy-curable composition is an ink or coating composition.

2. The composition according to claim 1, wherein less than 75% of the alcohols of the polyol are acrylated.

3. The composition according to claim 1, wherein less than 50% of the alcohols of the polyol are acrylated.

4. The composition according to claim 1, wherein the polyol used in the preparation of the partially acrylated polyol is a poly(ethoxylated) or poly(propoxylated) polyol.

5. The composition according to claim 4, wherein the average degree of alkoxylation per alcohol group is greater than 1.

6. The composition according to claim 1, further comprising any blend of free radical photoinitiators, preferably when the amount of said blend of photoinitiators is less than 8.0% particularly when said compositions are solely cured by the action of UV light.

7. The composition according to claim 1, which is UV-curable.

8. The composition according to claim 1, which is EB-curable.

9. The composition according to claim 1, which is cured by exposure to both UV and EB radiation.

10. The composition according to claim 1, wherein the polyol compound used to prepare the partially acrylated polyol has a molecular weight of less than 5,000, more preferably less than 2,500 and most preferably less than 1,500 g/mol.

11. The composition according to claim 1, wherein the partially acrylated polyol provides an equivalent hydroxy value of 2.5 mgKOH/g, or greater, preferably 5.0 mgKOH/g, or greater.

12. The composition according to claim 1, which is a pigmented inkjet ink.

13. The composition according to claim 1 which is a pigmented flexo ink.

14. The composition according to claim 1 which is a pigmented offset ink.

15. The composition according to claim 1, comprising 60 wt % to 85 wt % of the monofunctional or multifunctional free-radically polymerizable ethylenically unsaturated monomers and/or oligomers, based on the total weight of the composition; wherein the concentration of free-radically polymerizable ethylenically unsaturated monofunctional monomers is less than 20% by weight of the total composition.

16. A process for preparing a printed substrate, comprising printing the composition of claim 1 onto a substrate and curing.

17. The process of claim 16, wherein the composition is exposed to both UV and EB radiation.

18. The process of claim 16, wherein the composition is partially cured using any combination of UV-LED lamps, prior to EB-curing.

19. A printed substrate produced by applying the composition according to claim 1 onto a substrate and curing the composition, and/or obtainable from the process according to claim 16.

20. The printed substrate of claim 19, wherein the substrate is a plastic film.

21. A method of reducing the amount of uncured monomer in a cured ink or coating film comprising applying the composition claim 1 onto a substrate and curing the composition(s).

22. The composition according to claim 1 wherein, the general expression;

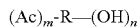

$(Ac)_m\text{-R---}(OH)_n$

Ac=an acrylate or methacrylate group;
m+n>2;
m≥1;
n>1.

* * * * *